US009122569B2

(12) United States Patent
Ishibashi et al.

(10) Patent No.: US 9,122,569 B2
(45) Date of Patent: Sep. 1, 2015

(54) PARKING ASSIST SYSTEM AND PARKING ASSIST METHOD

(75) Inventors: Masahisa Ishibashi, Nisshin (JP); Akiteru Takae, Okazaki (JP); Teruhide Hayashida, Tokyo (JP); Tetsuya Oda, Toyota (JP); Taisuke Tone, Toyota (JP); Yusuke Sato, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/984,410

(22) PCT Filed: Feb. 10, 2012

(86) PCT No.: PCT/IB2012/000236
§ 371 (c)(1),
(2), (4) Date: Aug. 8, 2013

(87) PCT Pub. No.: WO2012/110872
PCT Pub. Date: Aug. 23, 2012

(65) Prior Publication Data
US 2013/0317706 A1    Nov. 28, 2013

(30) Foreign Application Priority Data
Feb. 14, 2011  (JP) .................................. 2011-029118

(51) Int. Cl.
*B60R 22/00* (2006.01)
*E05F 15/00* (2006.01)
(Continued)

(52) U.S. Cl.
CPC ............ *G06F 17/00* (2013.01); *B62D 15/0275* (2013.01); *E05F 15/0004* (2013.01); *E05F 15/20* (2013.01); *E05F 15/2076* (2013.01); *E05F 2015/0086* (2013.01); *E05Y 2400/34* (2013.01); *E05Y 2400/356* (2013.01);
(Continued)

(58) Field of Classification Search
USPC ....................................... 701/49, 36
See application file for complete search history.

(56) References Cited

U.S. PATENT DOCUMENTS

| 2003/0052969 | A1* | 3/2003 | Satoh et al. ................... 348/148 |
| 2005/0151495 | A1* | 7/2005 | Miyauchi ...................... 318/469 |

(Continued)

FOREIGN PATENT DOCUMENTS

| DE | 103 23 077 A1 | 12/2004 |
| DE | 10323077 A1 * | 12/2004 |
| DE | 10 2007 062 473 A1 | 7/2009 |
| DE | 10 2009 040 994 A1 | 4/2010 |
| DE | 10 2010 001 263 A1 | 7/2011 |
| DE | 102010001263 A1 * | 7/2011 |
| JP | 3183284 B2 | 4/2001 |
| JP | 2004-276850 A | 10/2004 |
| JP | 2007-230502 A | 9/2007 |

(Continued)

OTHER PUBLICATIONS

International Search Report for corresponding International Patent Application No. PCT/IB2012/000236 mailed Oct. 17, 2012.

*Primary Examiner* — Imran Mustafa
(74) *Attorney, Agent, or Firm* — Sughrue Mion, PLLC

(57) ABSTRACT

A parking assist system includes: an actuator that drives a back door of a vehicle; an opening degree control unit that controls an opening degree of the back door by controlling the actuator; a storage device that stores an allowable opening degree of the back door at a park position of the vehicle in association with the park position; and a position information acquisition unit that acquires position information of the vehicle. When a position of the vehicle corresponds to the park position stored in the storage device, the opening degree control unit limits the opening degree of the back door on the basis of the allowable opening degree of the back door, stored in the storage device in association with the park position.

10 Claims, 4 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B62D 15/02* (2006.01)
  *E05F 15/20* (2006.01)

(52) U.S. Cl.
  CPC ......... *E05Y 2400/53* (2013.01); *E05Y 2800/00* (2013.01); *E05Y 2900/531* (2013.01); *E05Y 2900/546* (2013.01)
  USPC .............................................. 701/49; 701/36

(56) References Cited

U.S. PATENT DOCUMENTS

| | | | |
|---|---|---|---|
| 2006/0271278 | A1* | 11/2006 | Sakakibara et al. .......... 701/207 |
| 2008/0258934 | A1* | 10/2008 | Chemali .................... 340/932.2 |
| 2012/0191296 | A1* | 7/2012 | Cheal et al. ..................... 701/36 |
| 2013/0063601 | A1* | 3/2013 | Wakabayashi et al. ....... 348/148 |

FOREIGN PATENT DOCUMENTS

| | | |
|---|---|---|
| JP | 4075651 B2 | 2/2008 |
| JP | 2010-202071 A | 9/2010 |

\* cited by examiner

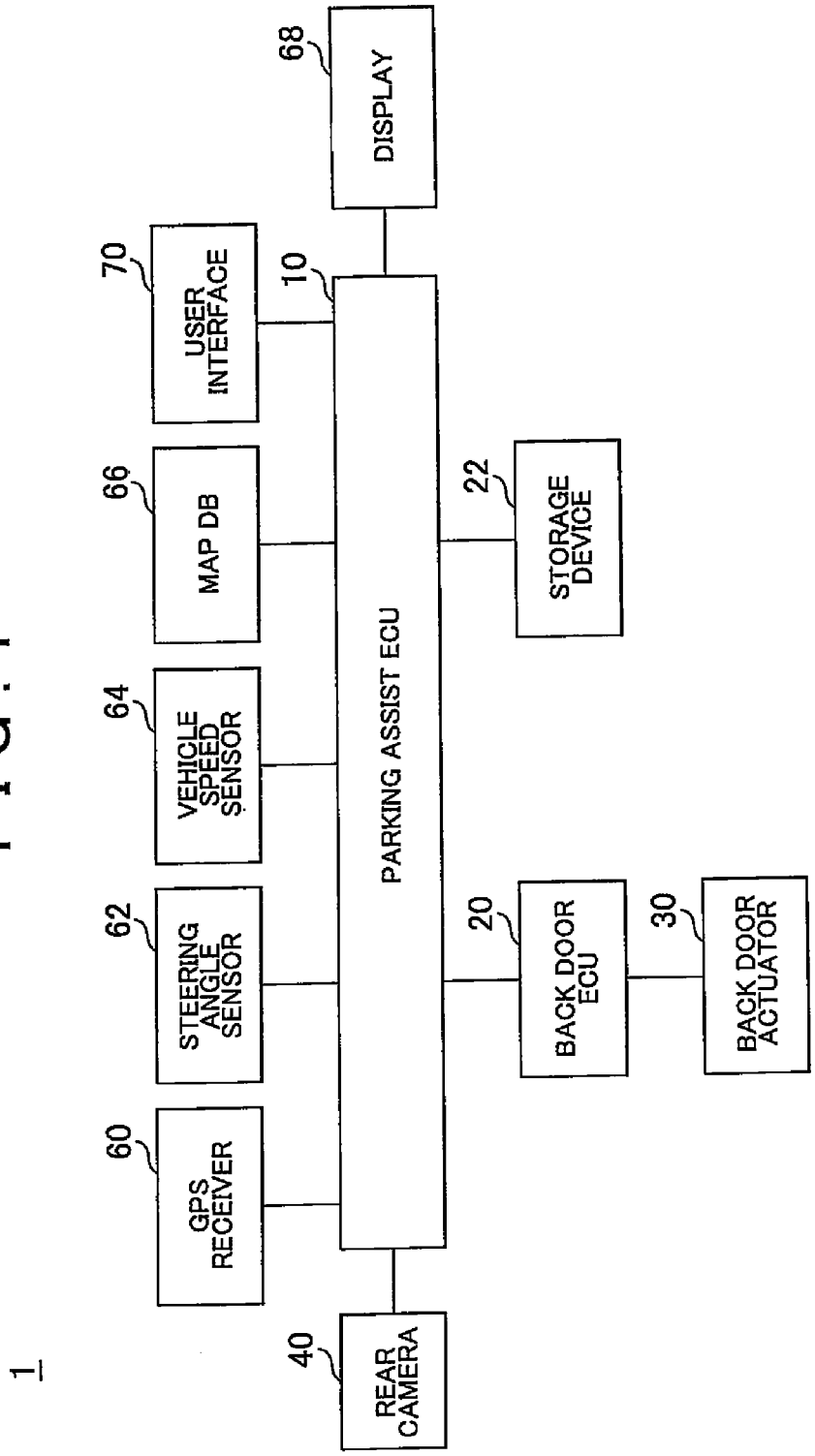

[FULLY OPEN]

[FULLY CLOSED]

PARKING ASSIST SYSTEM AND PARKING ASSIST METHOD

BACKGROUND OF THE INVENTION

1. Field of the Invention

The invention relates to a parking assist system and parking assist method that assist in opening a back door at a park position of a vehicle.

2. Description of Related Art

There is known a parking assist system that detects the steering angle of a steering wheel, that computes an assumed trajectory of a vehicle at the time when the vehicle is reversed at that steering angle and that displays a guide mark superimposed on the video image of a camera on the basis of the assumed trajectory (for example, see Japanese Patent No. 3183284).

In addition, there is known another parking assist system that, when a user sets that the trunk of a vehicle is scheduled to be opened and closed, corrects the timing at which the vehicle is stopped at the time when the vehicle is reversed in consideration of the length corresponding to a working space required to open and close the trunk of the vehicle (for example, see Japanese Patent No. 4075651).

However, with the invention described in Japanese Patent No. 3183284, depending on an environment around a parking space (situation, such as the distance to a wall and the height of a ceiling), there is a possibility that the back door cannot be opened to a desired opening degree when the vehicle is reversed to the limit and is parked in accordance with the guide mark.

In addition, with the invention described in Japanese Patent No. 4075651, the distance to a wall (wall adjacent to the rear side of the vehicle) within an environment around a parking space is considered; however, the height of a ceiling is not considered, so, for example, when the height of a ceiling is low, the back door may hit the ceiling when the back door is opened.

SUMMARY OF THE INVENTION

The invention provides a parking assist system and parking assist method that are able to appropriately limit the opening degree of a back door at a specific park position.

An aspect of the invention relates a parking assist system. The parking assist system includes: an actuator that drives a back door of a vehicle; an opening degree control unit that controls an opening degree of the back door by controlling the actuator; a storage device that stores an allowable opening degree of the back door at a park position of the vehicle in association with the park position; and a position information acquisition unit that acquires position information of the vehicle. When a position of the vehicle corresponds to the park position stored in the storage device, the opening degree control unit limits the opening degree of the back door on the basis of the allowable opening degree of the back door, stored in the storage device in association with the park position.

In the above aspect, the park position may be saved by a user.

In the above aspect, the allowable opening degree of the back door may be saved by a user.

In the above aspect, the parking assist system may further include: a rear camera; and a video image generating unit that superimposes a guide mark relevant to a space required to open the back door on a video image of the rear camera. When the position of the vehicle corresponds to the park position stored in the storage device, the video image generating unit may vary the guide mark on the basis of the allowable opening degree of the back door, stored in the storage device in association with the park position.

In the above aspect, a condition that the position of the vehicle may correspond to the park position stored in the storage device includes a condition that the position of the vehicle is around the park position stored in the storage device.

Another aspect of the invention relates a parking assist method for a vehicle that includes an actuator that drives a back door of the vehicle. The parking assist method includes: controlling an opening degree of the back door by controlling the actuator; storing an allowable opening degree of the back door at a park position of the vehicle in association with the park position; acquiring position information of the vehicle; and, when a position of the vehicle corresponds to the stored park position, limiting the opening degree of the back door on the basis of the allowable opening degree of the back door, stored in association with the park position.

In the above aspect, the park position may be saved by a user.

In the above aspect, the allowable opening degree of the back door may be saved by a user.

In the above aspect, the vehicle may include a rear camera. In the above aspect, the parking assist method may further comprise superimposing a guide mark relevant to a space required to open the back door on a video image of the rear camera; and when the position of the vehicle corresponds to the stored park position, varying the guide mark on the basis of the allowable opening degree of the back door, stored in association with the park position.

In the above aspect, a condition that the position of the vehicle corresponds to the stored park position may include a condition that the position of the vehicle is around the stored park position.

According to the aspects of the invention, it is possible to obtain the parking assist system and parking assist method that are able to appropriately limit the back door opening degree at the specific park position.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a system configuration diagram that shows the relevant configuration of a parking assist system according to one embodiment of the invention;

DETAILED DESCRIPTION OF EMBODIMENTS

Figure 2A:
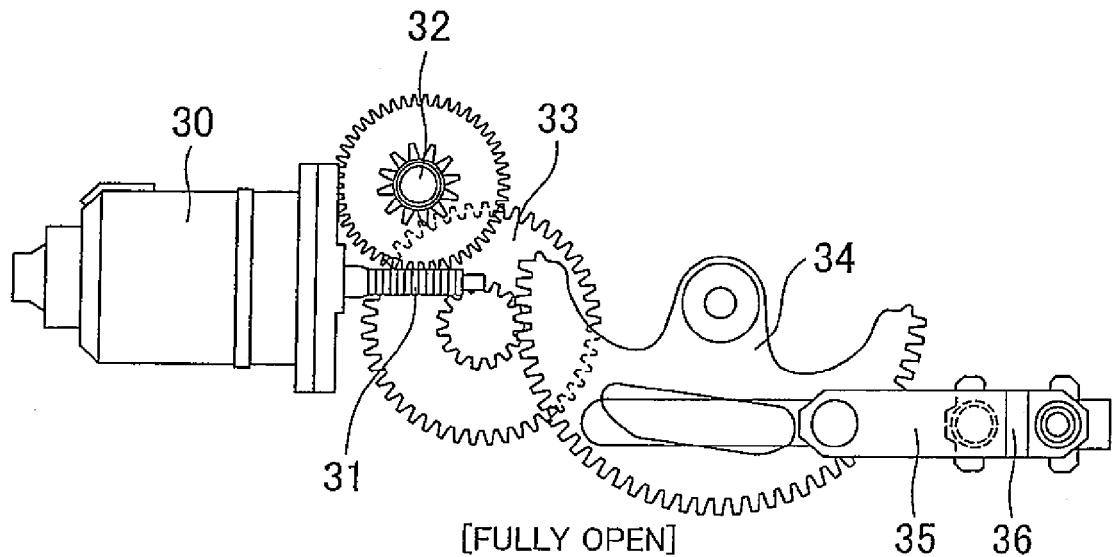
FIG. 2A and FIG. 2B are views that show an example of an open/close mechanism (drive unit) of a back door.

Hereinafter, an embodiment of the invention will be described with reference to the accompanying drawings.

FIG. 1 is a system configuration diagram that shows the relevant configuration of a parking assist system 1 according to one embodiment of the invention.

The parking assist system 1 is mainly formed of a parking assist electronic control unit (ECU) 10 and a back door ECU 20. Each of the ECUs 10 and 20 is configured as a microcomputer formed of a CPU, a ROM, a RAM, and the like, that are connected to one another via a bus (not shown). The ROM stores programs and data that are executed by the CPU. Note that part and/or whole of the functions of each of the ECUs 10 and 20 may be implemented by the other one of the ECUs 10 and 20 or may be implemented by another ECU other than the ECUs 10 and 20. For example, part and/or whole of the functions of the parking assist ECU 10 may be implemented by a navigation ECU of a navigation system.

A map database 66, a display 68, a user interface 70 and a storage device 22 are connected to the parking assist ECU 10. The map database 66 holds map data on a storage medium, such as an HDD, a DVD and a CD-ROM. The display 68, such as a liquid crystal display, outputs a map and a route guidance by video image. The user interface 70 is, for example, a touch panel. The map database 66 stores given map data. The map data includes the coordinate information of nodes respectively corresponding to merging points and branch points of intersections and expressways, link information that connects any adjacent nodes, width information of roads corresponding to the links, road types, such as a national highway, a prefectural highway and an expressway, corresponding to the links, traffic regulation information of the links, traffic regulation information between the links, and the like.

A park position (described later) and a back door allowable opening degree are associated with each other and stored in the storage device 22. The storage device 22 is a rewritable storage device. The storage device 22 may be an external storage device that is connected to the parking assist ECU 10 or may be a storage device in the parking assist ECU 10. In addition, the storage device 22 may be implemented by the storage device shared with the map database 66.

In addition, a steering angle sensor 62 and a wheel speed sensor 64 are connected to the parking assist ECU 10. The steering angle sensor 62 detects the steering angle of a steering wheel (not shown). The wheel speed sensor 64 detects the speed of the vehicle.

In addition, a global positioning system (GPS) receiver 60 is connected to the parking assist ECU 10. The GPS receiver 60 receives GPS signals output from GPS satellites via a GPS antenna, and computes a current vehicle position and a current vehicle direction. A positioning method may be selected, and an interferometric positioning method, or the like, may be employed. In addition to the GPS receiver 60, a gyro sensor (not shown) or the wheel speed sensor 64 may be utilized to detect a vehicle position. In addition, the parking assist ECU 10 may use a map matching technique to correct a current vehicle position, and the like, computed by the GPS receiver 60.

In addition, a rear camera 40 is connected to the parking assist ECU 10. The rear camera 40 captures a landscape in a predetermined angular region behind the vehicle. The rear camera 40 may have a charge-coupled device (CCD), a complementary metal oxide semiconductor (CMOS), or the like, as an imaging device, and captures a relatively wide-angle landscape using a wide-angle lens.

In addition, the back door ECU 20 is connected to the parking assist ECU 10 via a bus, such as a controller area network (CAN). A back door actuator 30 is connected to the back door ECU 20. The back door actuator 30 generates power for opening or closing a back door (trunk). The back door is configured such that the opening degree of the back door is adjustable within the range of 0 to 100%. The back door opening degree may be adjustable linearly (steplessly) within the range of 0 to 100% or may be adjustable in a discrete mode of two or more steps. The back door opening degree may be adjusted by operating the back door actuator 30 under control of the back door ECU 20.

Figure 2B:
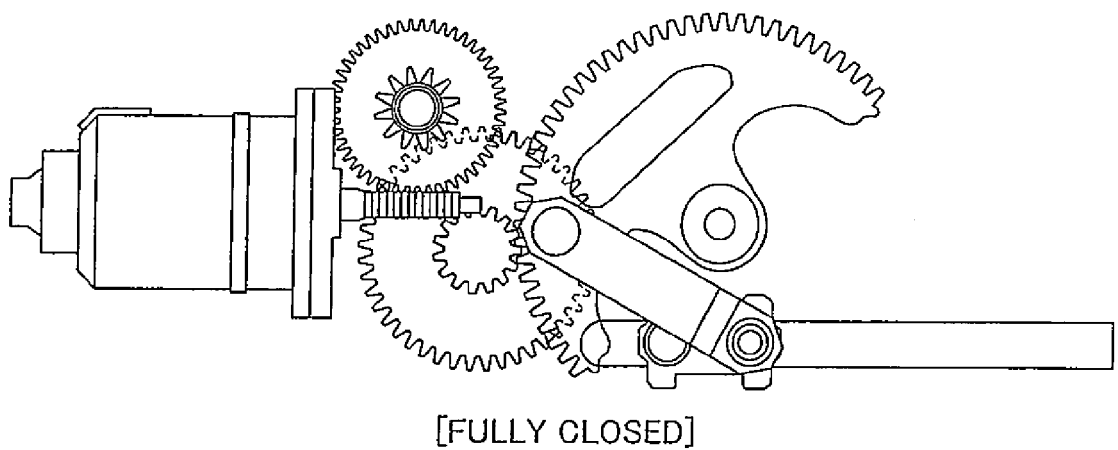

FIG. 2A and FIG. 2B are views that show an example of an open/close mechanism (drive unit) of the back door. FIG. 2A shows a state where the back door is fully open. FIG. 2B shows a state where the back door is fully closed.

The open/close mechanism shown in FIG. 2A and FIG. 2B includes the back door actuator 30, a worm gear 31, a first gear 32, a second gear 33, a driven gear 34, a link 35 and a slider 36. The back door actuator 30 is formed of an electric motor. The slider 36 is connected to an arm assembled to the back door. As the back door actuator 30 rotates in a forward direction or a reverse direction, the worm gear 31 rotates in accordance with the rotation direction of the back door actuator 30, and the rotation is sequentially transmitted through the first gear 32 and the second gear 33 to the driven gear 34. The link 35 is coupled to the driven gear 34, and the link 35 drives the slider 36 in the direction to open the back door or the direction to close the back door through. the rotation of the driven gear 34. By so doing, the arm assembled to the back door is pushed or pulled to open or close the back door. Note that the back door ECU 20 may detect the back door opening degree on the basis of a signal from a Hall integrated circuit in the back door actuator 30.

Figure 3:
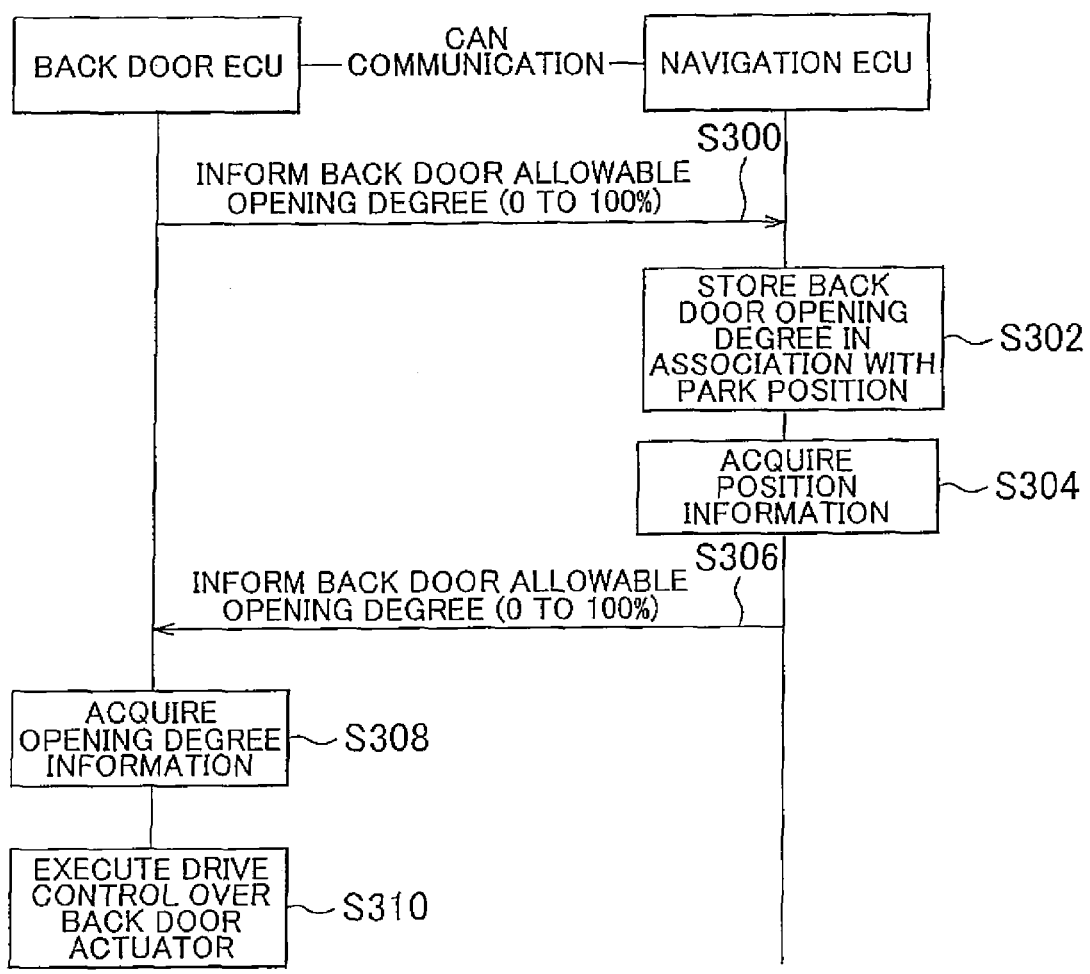
FIG. 3 is a view that shows an example of a main process executed by a parking assist ECU and a back door ECU.

FIG. 3 is a view that shows an example of a main process executed by the parking assist ECU 10 and the back door ECU 20.

In step 300, a back door allowable opening degree is provided from the back door ECU 20 to the parking assist ECU 10. The back door allowable opening degree is stored in association with a park position as will be described later. The provided back door allowable opening degree may be a current back door opening degree. For example, the user, for example, operates an operation switch (an example of the user interface 70) or operates the back door by hand to adjust the back door opening degree. Then, when the back door opening degree, which is desired to be saved as the back door allowable opening degree, is achieved, a save switch is, for example, operated. In response to this, the back door ECU 20 informs the parking assist ECU 10 such that the current back door opening degree is saved as the back door allowable opening degree. Note that the back door allowable opening degree may be directly input by the user through the user interface 70.

In step 302, the parking assist ECU 10 associates the back door opening degree informed from the back door ECU 20 with a specific park position to save (store) the back door opening degree in the storage device 22 as the back door allowable opening degree. The specific park position may be, for example, implemented in such a manner that the user specifies the specific park position in a map on the display 68 by touching, or the like. The specific park position may include the parking lot of a user's home. In addition, the specific park position may be, for example, a vehicle position (vehicle position computed by the GPS receiver 60) at the time when the save switch is operated. In this case, for example, when the user operates the save switch in the case where the user intends to save the current back door opening degree at the current park position as the back door allowable opening degree, the park position may be saved in association with the back door allowable opening degree.

In this way, through the process of steps 300 and 302, the user is able to save a park position in association with the back door allowable opening degree at the park position. Note that multiple sets of a park position and an associated back door allowable opening degree may be stored (saved) in correspondence with a plurality of park positions.

Step 304 to step 310 relate to a method of controlling the back door opening degree on the basis of the saved information. The process of step 304 to step 310 may be executed in a situation and/or a time different from the process of steps 300 and 302. For example, the process of steps 300 and 302 (saving process) may be executed initially in a parked state (for example, at a home parking lot), and then, after the vehicle is started to move, the process of step 304 to step 310 may be executed when the vehicle is parked again.

In step 304, the parking assist ECU 10 acquires current vehicle position information from the GPS receiver 60, and detects that the current vehicle position corresponds to the park position stored (saved) in the storage device 22. Note that the process may be implemented by constantly monitoring a vehicle position from the GPS receiver 60. Alternatively, the process may be executed at the time when a parked state (or a stage just before parking) has been detected. The parked state may be determined in consideration of whether a shift position is at a parking position, whether an engine is turned off, whether the on/off states of a door switch are changed, or the like. Alternatively, the process may be executed when there is a request from the back door ECU 20. The back door ECU 20 may issue a request to the parking assist ECU 10, for example, when a switch for instructing to open the back door is operated by the user.

In step 306, the parking assist ECU 10 responds to (informs) the back door ECU 20 the back door allowable opening degree that is stored in the storage device 22 in association with the park position corresponding to the current vehicle position. Note that when there is no back door allowable opening degree stored in the storage device 22 in association with the park position (that is, when the current vehicle position is not the park position stored in the storage device 22), nothing may be informed from the parking assist ECU 10 to the back door ECU 20 or information about the above situation may be informed.

In step 308, the back door ECU 20 receives (acquires) the back door allowable opening degree (opening degree information) transmitted from the parking assist ECU 10.

In step 310, the back door ECU 20 executes drive control over the back door actuator 30 such that the back door opening degree becomes equal to or lower than the back door allowable opening degree transmitted from the parking assist ECU 10. For example, when the back door allowable opening degree saved in association with this park position is 80%, as instructions to open the back door are input by the user (for example, as the switch is operated), the back door actuator 30 is subjected to drive control such that the back door opening degree becomes equal to or lower than 80%. Note that when there is no back door allowable opening degree stored in the storage device 22 in association with this park position, 100% back door opening degree may be achieved as a default.

In this way, with the process shown in FIG. 3, at a park position that is saved in advance by the user, the back door opening degree lower than or equal to the back door allowable opening degree saved in association with the park position is automatically achieved. By so doing, it is possible to achieve an optimal back door opening degree appropriate to a surrounding environment that can vary for each park position. Particularly, in a situation that the back door is opened and a luggage needs to be unloaded when parked in a parking lot, or the like, with a fence or a ceiling, there can be a situation that the back door hits the fence or the ceiling if the back door is opened at 100% back door opening degree. In such a situation, it may be necessary to move the vehicle forward again in order to open the back door so as not to hit the fence or the ceiling or it may be necessary to retain the back door by user's hand so as not to hit the fence or the ceiling. In contrast to this, according to the process shown in FIG. 3, for a parking lot in such a situation, an appropriate back door allowable opening degree is saved in advance to thereby make it possible to prevent inconvenience that the user is forced to move the vehicle again or to retain the back door by hand. That is, this prevents inconvenience, such as moving the vehicle again after completion of parking, in order to open the back door so as not to hit a fence or a ceiling, and improves convenience.

Note that, in the configuration that the back door ECU 20 executes drive control over the back door actuator 30 such that the back door opening degree coincides with the backdoor allowable opening degree, the user just needs to save the back door opening degree desired to be achieved at that park position as the back door allowable opening degree. In addition, in the configuration that the back door ECU 20 executes drive control over the back door actuator 30 such that the back door opening degree becomes lower than the back door allowable opening degree (for example, an opening degree lower by several percent than the back door allowable opening degree), the user just needs to save an upper limit back door opening degree (limit opening degree) that should not be exceeded at that park position as the back door allowable opening degree.

Next, a guide mark display function that may be selectively executed by the parking assist ECU 10 when the vehicle is reversed at the time of parking will be described.

Figure 4:
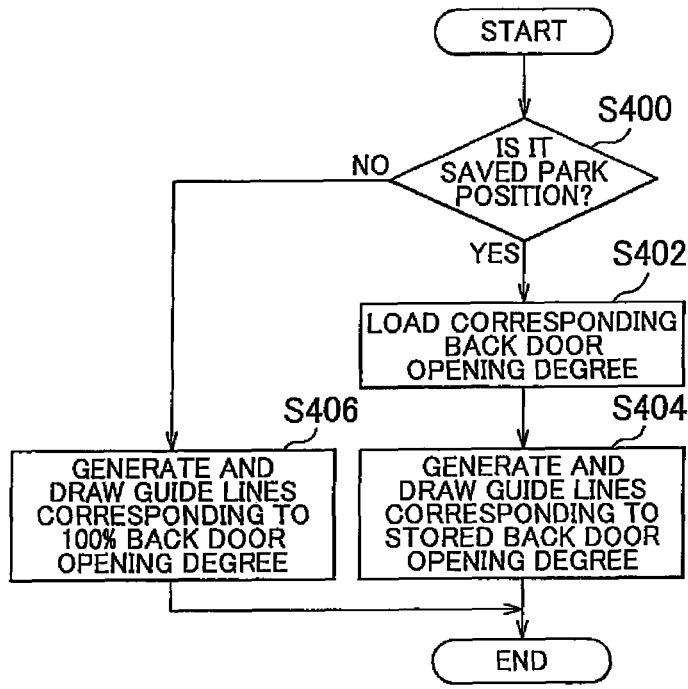
FIG. 4 is a flow chart that shows an example of a process relevant to a guide mark display function that may be executed by the parking assist ECU.

FIG. 4 is a flow chart that shows an example of a process relevant to the guide mark display function that may be executed by the parking assist ECU 10. The process shown in FIG. 4 may be started and executed at the time of the start of parking. The start of parking may be, for example, detected when the user operates a park assist switch.

In step 400, the parking assist ECU 10 acquires current vehicle position information from the GPS receiver 60, and determines whether the current vehicle position corresponds to the park position stored (saved) in the storage device 22. Note that whether the current vehicle position corresponds to the park position stored in the storage device 22 may be determined on the basis of whether the current vehicle position is around the park position stored in the storage device 22. That is, it is determined whether the current vehicle position is a position at which the vehicle is started to be parked at the park position stored in the storage device 22. When the current vehicle position, corresponds to the stored park position, the process proceeds to step 402; whereas, when the current vehicle position does not correspond to the stored park position, the process proceeds to step 406.

In step 402, the parking assist ECU 10 extracts and loads the back door allowable opening degree, which is associated with the park position corresponding to the current vehicle position, from the storage device 22.

Figure 5:
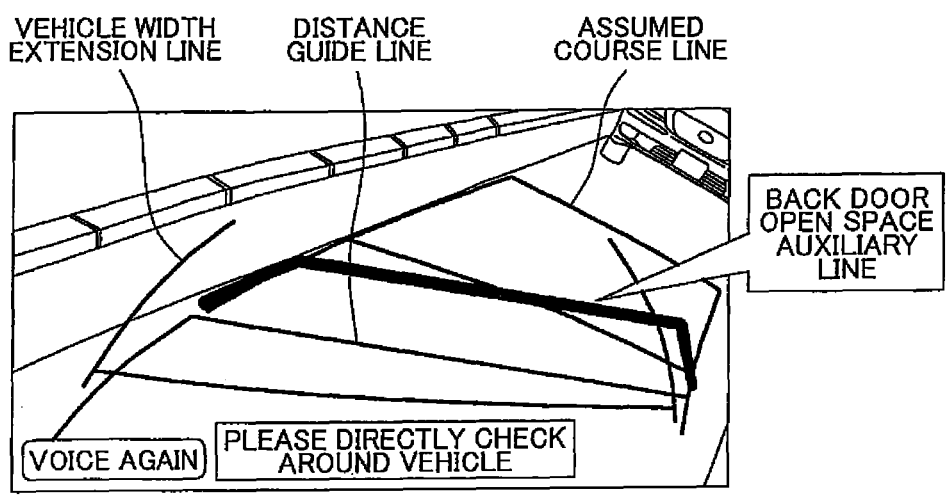
FIG. 5 is a view that shows an example of guide marks that include a back door open space auxiliary line.

In step 404, the parking assist ECU 10 generates (draws) a back door open space auxiliary line on the basis of the back door allowable opening degree loaded in step 402. As shown in FIG. 5, the parking assist ECU 10 displays the generated back door open space auxiliary line on the display 68 so as to be superimposed on the video image from the rear camera 40 together with other guide lines. The back door open space auxiliary line may be a guide mark that indicates a space required when the back door is open. As shown in FIG. 5, the back door open space auxiliary line may be drawn with reference to a distance guide line (line that indicates a position about 0.5 m ahead).

Here, the back door open space auxiliary line indicates a space, particularly, a space in the depth direction, required when the back door is open. The space required when the back door is open varies with the back door opening degree. In consideration of this point, in step 404, the position of the back door open space auxiliary line (in the present embodiment, the position with respect to the distance guide line, that is, the position with respect to the vehicle rear end) is varied on the basis of the back door allowable opening degree.

In step 406, the parking assist ECU 10 generates (draws) the back door open space auxiliary line corresponding to 100% back door opening degree (default back door opening degree). The parking assist ECU 10 displays the generated back door open space auxiliary line on the display 68 so as to be superimposed on the video image from the rear camera 40 together with other guide lines.

Note that the processing routine of FIG. 4 may be executed until parking is completed. As parking is completed, the process of steps 304 (or 306) to 310 shown in FIG. 3 may be executed.

With the process shown in FIG. 4, the user is allowed to reverse the vehicle to an appropriate position for the back door opening degree (back door allowable opening degree) while viewing the back door open space auxiliary line.

Note that the back door open space auxiliary line in step 402 or step 404 may be drawn or superimposed only when a user's intention to open the back door after completion of parking has been detected. The user's intention may be, for example, detected (input) through the user interface 70. In addition, the back door open space auxiliary line corresponding to 100% back door opening degree is constantly drawn and superimposed irrespective of the back door allowable opening degree.

Note that the above described embodiment may be applied for a vehicle (such as a hatchback car and a minivan) of which the back door opens rearward beyond the rear of the vehicle and higher than the vehicle height; however, it is also be applicable to another vehicle.

The embodiment of the invention is described in detail above; however, the aspects of the invention are not limited to the above described embodiment. Various modifications or replacements may be added to the above described embodiment without departing from the scope of the invention.

The invention claimed is:

1. A parking assist system comprising:
   an actuator that drives a back door of a vehicle;
   an opening degree control unit that controls an opening degree of the back door by controlling the actuator;
   a storage unit that stores an allowable opening degree of the back door at a park position of the vehicle in association with the park position; and
   a position information acquisition unit that acquires position information of the vehicle,
   wherein when a position of the vehicle corresponds to the park position stored in the storage device, the opening degree control unit limits the opening degree of the back door on the basis of the allowable opening degree of the back door, stored in the storage device in association with the park position.

2. The parking assist system according to claim 1, wherein the park position is saved by a user.

3. The parking assist system according to claim 1, wherein the allowable opening degree of the back door is saved by a user.

4. The parking assist system according to claim 1, further comprising:
   a rear camera; and
   a video image generating unit that superimposes a guide mark relevant to a space required to open the back door on a video image of the rear camera,
   wherein when the position of the vehicle corresponds to the park position stored in the storage unit, the video image generating unit varies the guide mark on the basis of the allowable opening degree of the back door, stored in the storage unit in association with the park position.

5. The parking assist system according to claim 1, wherein a condition that the position of the vehicle corresponds to the park position stored in the storage unit includes a condition that the position of the vehicle is around the park position stored in the storage unit.

6. A parking assist method for a vehicle that includes an actuator that drives a back door of the vehicle comprising:
   controlling an opening degree of the back door by using an electronic control unit configured with program logic to control the actuator;
   storing, in a storage unit, an allowable opening degree of the back door at a park position of the vehicle in association with the park position;
   acquiring position information of the vehicle; and
   when a position of the vehicle corresponds to the stored park position, limiting the opening degree of the back door on the basis of the allowable opening degree of the back door, stored in association with the park position.

7. The parking assist method according to claim 6, wherein the park position is saved by a user.

8. The parking assist method according to claim 6, wherein the allowable opening degree of the back door is saved by a user.

9. The parking assist method according to claims 6, wherein the vehicle includes a rear camera, the parking assist method further comprising:
   superimposing a guide mark relevant to a space required to open the back door on a video image of the rear camera; and
   when the position of the vehicle corresponds to the stored park position, varying the guide mark on the basis of the allowable opening degree of the back door, stored in association with the park position.

10. The parking assist method according to claim 6, wherein a condition that the position of the vehicle corresponds to the stored park position includes a condition that the position of the vehicle is around the stored park position.

* * * * *